(12) United States Patent
Hager et al.

(10) Patent No.: US 11,761,429 B2
(45) Date of Patent: Sep. 19, 2023

(54) SLIDE BEARING, IN PARTICULAR FOR A GEARBOX OF A WIND TURBINE

(71) Applicant: Miba Gleitlager Austria GmbH, Laakirchen (AT)

(72) Inventors: Gunther Hager, Micheldorf (AT); Johannes Sebastian Hoelzl, Berg im Attergau (AT); Sigmar Dominic Josef Janisch, Laakirchen (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 351 days.

(21) Appl. No.: 17/293,951

(22) PCT Filed: Dec. 6, 2019

(86) PCT No.: PCT/AT2019/060419
§ 371 (c)(1),
(2) Date: May 14, 2021

(87) PCT Pub. No.: WO2020/118327
PCT Pub. Date: Jun. 18, 2020

(65) Prior Publication Data
US 2022/0003218 A1 Jan. 6, 2022

(30) Foreign Application Priority Data
Dec. 13, 2018 (AT) .............. A 51109/2018

(51) Int. Cl.
*F03D 80/70* (2016.01)
*F03D 15/00* (2016.01)

(52) U.S. Cl.
CPC ............. *F03D 80/70* (2016.05); *F03D 15/00* (2016.05); *F05B 2230/10* (2013.01);
(Continued)

(58) Field of Classification Search
CPC . F03D 80/70; F05B 2240/50; F16H 2057/085
See application file for complete search history.

(56) References Cited

U.S. PATENT DOCUMENTS 3,203,260 A 8/1965 Pierry et al.
6,637,942 B2 10/2003 Dourlens et al.
(Continued)

FOREIGN PATENT DOCUMENTS

AT 509 625 B1 10/2011
AT 519288 A1 5/2018
(Continued)

OTHER PUBLICATIONS

Li Yunlong, Discussion on Localization of Composite Material Sliding Bearing in Hydropower Projects, Hongshui River, vol. 35, Issue 2, 4 pages, with English Abstract at the end of the document, Apr. 2016.
(Continued)

*Primary Examiner* — Anthony Ayala Delgado
(74) *Attorney, Agent, or Firm* — Collard & Roe, P.C.

(57) ABSTRACT

A sliding bearing for a gearbox of a wind turbine, having a support body and a sliding layer which is applied on the support body, and on which a sliding surface is formed, wherein a lubricant distribution groove extending in an axial direction of the sliding surface is formed on the sliding surface. The support body is formed as a bush rolled from a support body strip, wherein a first longitudinal end and a second longitudinal end of the support body strip are connected to one another in a materially bonded manner, in particular by a welding connection, at a joint, wherein the joint is formed in the region of the lubricant distribution groove.

10 Claims, 3 Drawing Sheets

(52) U.S. Cl.
CPC ..... *F05B 2230/233* (2013.01); *F05B 2230/26* (2013.01); *F05B 2240/50* (2013.01); *F05B 2260/40311* (2013.01); *F05B 2260/98* (2013.01)

(56) References Cited

U.S. PATENT DOCUMENTS

| | | | |
|---|---|---|---|
| 6,866,423 B2 | 3/2005 | Faltus et al. | |
| 7,794,151 B2 | 9/2010 | Neumann | |
| 7,832,980 B2 | 11/2010 | Demtroder et al. | |
| 8,545,186 B2 | 10/2013 | Loeschner et al. | |
| 8,591,371 B2* | 11/2013 | Dinter | F16C 33/1055 475/160 |
| 8,840,521 B2 | 9/2014 | Kari et al. | |
| 8,974,120 B2 | 3/2015 | Pedersen et al. | |
| 9,057,365 B2 | 6/2015 | Han et al. | |
| 9,206,787 B2 | 12/2015 | Winkelmann | |
| 9,279,413 B2 | 3/2016 | Ebbesen et al. | |
| 9,297,454 B2 | 3/2016 | Barthel et al. | |
| 9,435,376 B2 | 9/2016 | Gaertner et al. | |
| 9,458,880 B2 | 10/2016 | Kari et al. | |
| 9,657,716 B2 | 5/2017 | Vervoorn et al. | |
| 9,677,606 B2 | 6/2017 | Pischel | |
| 9,683,602 B2 | 6/2017 | Hager et al. | |
| 9,784,245 B2 | 10/2017 | Hager et al. | |
| 9,845,826 B2 | 12/2017 | Sutton et al. | |
| 9,869,349 B2 | 1/2018 | Rittmann et al. | |
| 10,072,704 B2 | 9/2018 | Sato et al. | |
| 10,436,249 B2* | 10/2019 | Hoelzl | F16C 33/122 |
| 10,502,259 B2 | 12/2019 | Meyer | |
| 10,598,214 B2 | 3/2020 | Hoelzl | |
| 10,724,624 B2 | 7/2020 | Tulokas | |
| 2002/0114549 A1 | 8/2002 | Hokkirigawa et al. | |
| 2003/0063821 A1 | 4/2003 | Dourlens et al. | |
| 2010/0111459 A1 | 5/2010 | Yasuda | |
| 2013/0172144 A1* | 7/2013 | Suzuki | B23P 19/04 475/159 |
| 2014/0161614 A1 | 6/2014 | Vervoorn et al. | |
| 2014/0169952 A1 | 6/2014 | Pedersen et al. | |
| 2014/0193262 A1 | 7/2014 | Pedersen et al. | |
| 2014/0193264 A1 | 7/2014 | Pedersen et al. | |
| 2014/0377063 A1 | 12/2014 | Guerenbourg et al. | |
| 2015/0017000 A1 | 1/2015 | Sato et al. | |
| 2015/0055899 A1* | 2/2015 | Kodama | B23P 15/003 384/279 |
| 2015/0159693 A1 | 6/2015 | Corts | |
| 2015/0204383 A1* | 7/2015 | Ishii | F16H 25/24 264/267 |
| 2015/0369284 A1 | 12/2015 | Hager et al. | |
| 2016/0076522 A1 | 3/2016 | Rohden | |
| 2020/0158090 A1 | 5/2020 | Hager et al. | |

FOREIGN PATENT DOCUMENTS

| | | |
|---|---|---|
| AT | 15975 U1 | 10/2018 |
| AU | 650057 B2 | 3/1992 |
| AU | 2008331343 A1 | 2/2010 |
| CN | 101438068 A | 5/2009 |
| CN | 101965455 A | 2/2011 |
| CN | 102009663 A | 4/2011 |
| CN | 202082374 U | 12/2011 |
| CN | 102345676 A | 2/2012 |
| CN | 102418833 A | 4/2012 |
| CN | 102713276 A | 10/2012 |
| CN | 103557124 A | 2/2014 |
| CN | 103765005 A | 4/2014 |
| CN | 104234949 A | 12/2014 |
| CN | 104819209 A | 8/2015 |
| CN | 104956101 A | 9/2015 |
| CN | 204627877 U | 9/2015 |
| CN | 106062391 A | 10/2016 |
| CN | 106164509 A | 11/2016 |
| CN | 106884972 A | 6/2017 |
| CN | 108167442 A1 | 6/2018 |
| CN | 108884863 A | 11/2018 |
| DE | 37 02 008 A1 | 8/1988 |
| DE | 3726751 A1 | 2/1989 |
| DE | 10064261 A1 | 7/2002 |
| DE | 10 2005 001 344 A1 | 7/2006 |
| DE | 10 2005 018 836 B3 | 12/2006 |
| DE | 60219261 T2 | 1/2008 |
| DE | 10 2011 119 471 A1 | 5/2013 |
| DE | 10 2012 212 792 A1 | 1/2014 |
| DE | 10 2013 211 710 B3 | 10/2014 |
| DE | 10 2014 205 637 A1 | 10/2015 |
| DE | 11 2013 003 034 B4 | 8/2017 |
| EP | 1 564 406 A1 | 8/2005 |
| EP | 1 564 406 A2 | 8/2005 |
| EP | 2 003 334 A1 | 12/2008 |
| EP | 2 136 093 A1 | 12/2009 |
| EP | 2290269 A1 | 3/2011 |
| EP | 2 383 480 B1 | 10/2012 |
| EP | 2 568 163 A1 | 3/2013 |
| EP | 2 597 307 A2 | 5/2013 |
| EP | 2 600 037 A1 | 6/2013 |
| EP | 2 657 519 A1 | 10/2013 |
| EP | 2 679 492 A1 | 1/2014 |
| EP | 2 711 568 A1 | 3/2014 |
| EP | 2816226 A1 | 12/2014 |
| EP | 2 863 076 A1 | 4/2015 |
| EP | 2 955 413 A1 | 12/2015 |
| EP | 3 012 479 A1 | 4/2016 |
| EP | 3 040 553 A1 | 7/2016 |
| EP | 3091242 A1 | 11/2016 |
| EP | 3 139 034 A1 | 3/2017 |
| EP | 3 173 642 A1 | 5/2017 |
| EP | 3 252 306 A1 | 6/2017 |
| EP | 3 279 471 A1 | 2/2018 |
| EP | 3 343 071 A1 | 7/2018 |
| EP | 3 396 187 A1 | 10/2018 |
| GB | 1405118 A | 9/1975 |
| GB | 2 201 200 B | 8/1990 |
| JP | S59-54812 A | 3/1984 |
| JP | H04-203566 A | 7/1992 |
| JP | H07-3248 B2 | 1/1995 |
| JP | H07-293556 A | 11/1995 |
| JP | H11-303857 A | 11/1999 |
| JP | 2002-195261 A1 | 7/2002 |
| JP | 2003176822 A | 6/2003 |
| JP | 2003194071 A | 7/2003 |
| JP | 2006-118552 A | 5/2006 |
| JP | 2006118552 A | 5/2006 |
| JP | 2010-101263 A | 5/2010 |
| JP | 2010151207 A | 7/2010 |
| JP | 2014159861 A | 9/2014 |
| JP | 2015-001279 A | 1/2015 |
| JP | 2017-048849 A | 3/2017 |
| KR | 2014-0143620 A | 12/2014 |
| WO | 2007/071239 A1 | 6/2007 |
| WO | 2011/127509 A1 | 10/2011 |
| WO | 2011/127510 A1 | 10/2011 |
| WO | 2013/191163 A1 | 12/2013 |
| WO | 2014/005587 A1 | 1/2014 |
| WO | 2014/117196 A1 | 8/2014 |
| WO | 2014/173808 A1 | 10/2014 |
| WO | 2018/071941 A1 | 4/2018 |

OTHER PUBLICATIONS

International Search Report in PCT/AT2019/060420, dated Mar. 5, 2020.

International Search Report in PCT/AT2019/060424, dated Apr. 3, 2020.

International Search Report in PCT/AT2019/060425, dated Apr. 14, 2020.

International Search Report in PCT/AT2019/060421, dated Apr. 3, 2020.

International Search Report in PCT/AT2019/060426, dated Apr. 7, 2020.

(56) References Cited

OTHER PUBLICATIONS

International Search Report in PCT/AT2019/060419, dated Mar. 26, 2020.

* cited by examiner

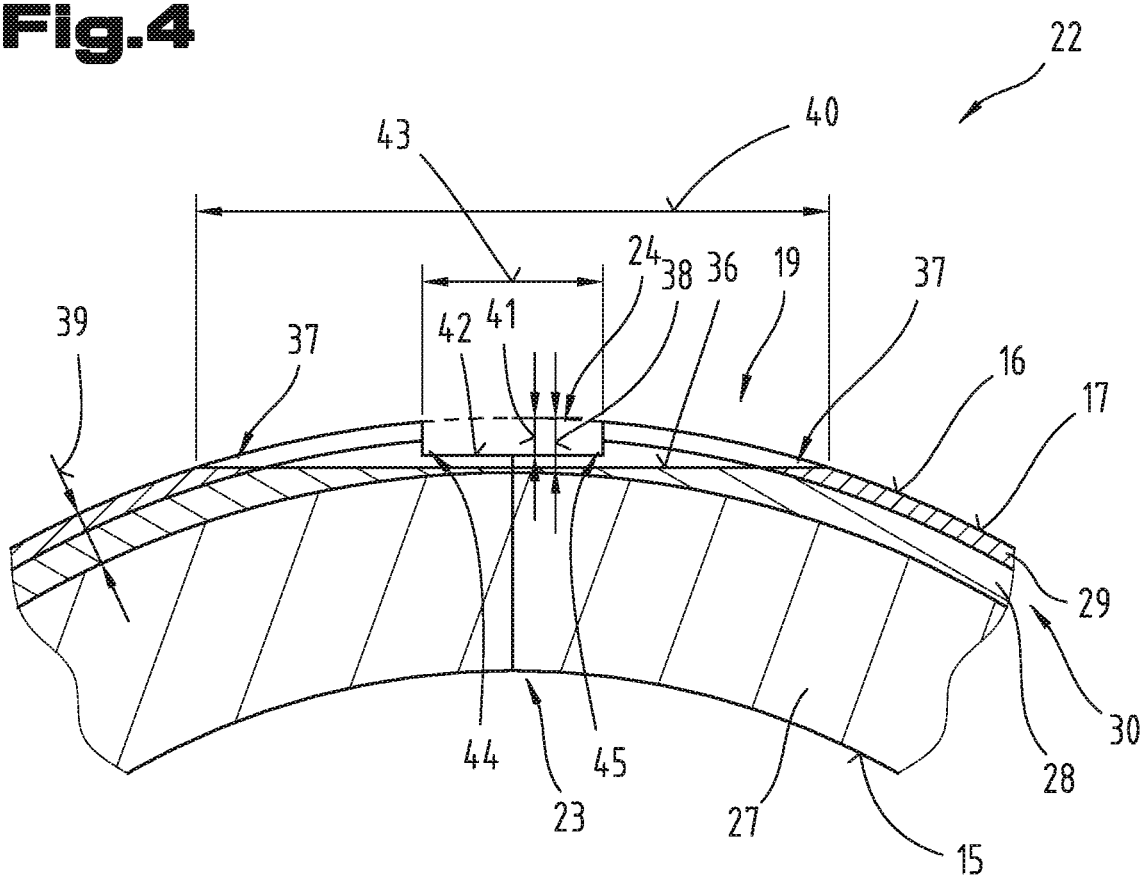
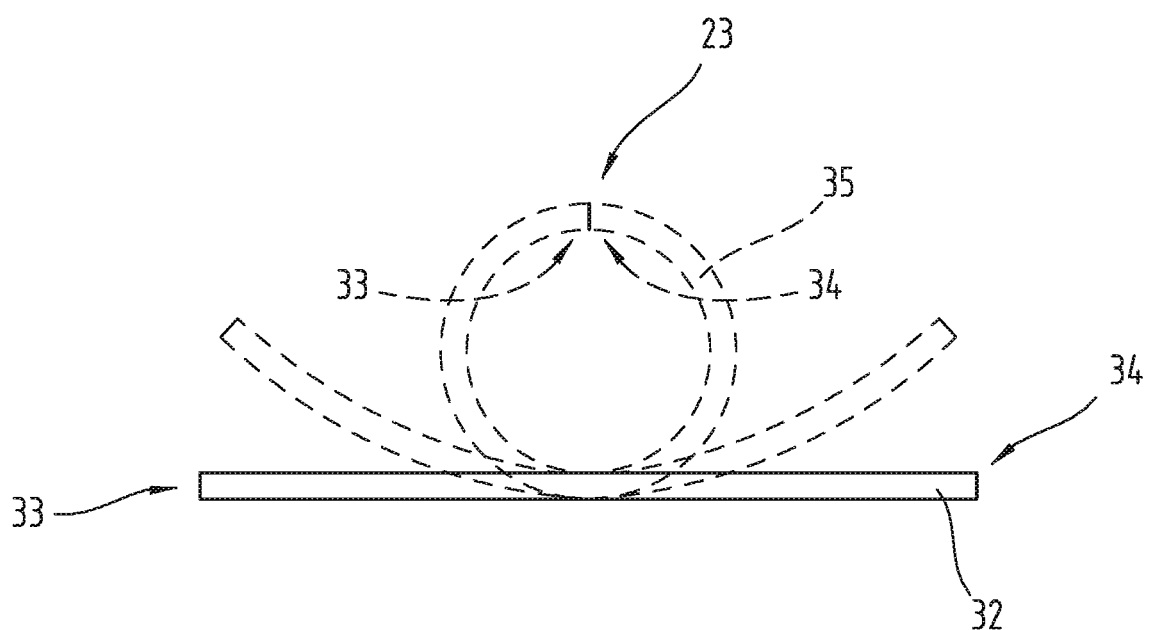

SLIDE BEARING, IN PARTICULAR FOR A GEARBOX OF A WIND TURBINE

CROSS REFERENCE TO RELATED APPLICATIONS

This application is the National Stage of PCT/AT2019/060419 filed on Dec. 6, 2019, which claims priority under 35 U.S.C. § 119 of Austrian Application No. A51109/2018 filed on Dec. 13, 2018, the disclosure of which is incorporated by reference. The international application under PCT article 21 (2) was not published in English.

The invention relates to a planetary gearbox as well as to a wind turbine equipped with the planetary gearbox.

A generic planetary gearbox is known, for example, from WO 2011127509 A1 of the same applicant.

A further generic planetary gearbox is known from EP 2 383 480 B1. The planetary gearbox known from EP 2 383 480 B1 has the disadvantage that the sliding bearings of the planetary gearbox are complex to produce.

It was the object of the present invention to overcome the disadvantages of the prior art and to provide a planetary gearbox for a wind turbine with an increased failure safety.

This object is achieved by means of a device and a method according to the claims.

Sliding bearing, in particular for a gearbox of a wind turbine, having a support body and a sliding layer which is applied on the support body, and on which a sliding surface is formed, wherein a lubricant distribution groove extending in an axial direction of the sliding surface is formed on the sliding surface. The support body is formed as a bush rolled from a support body strip, wherein a first longitudinal end and a second longitudinal end of the support body strip are connected to one another in a materially bonded manner, in particular by a welding connection, at a joint, wherein the joint is formed in the region of the lubricant distribution groove.

The sliding bearing according to the invention entails the advantage that the lubricant distribution groove may serve at least in some sections for clearance of the joint. By this measure, the sliding surface of the sliding bearing may be raised, whereby the wear of the sliding bearing may be reduced. Moreover, the surprising advantage occurs that the sliding bearing according to the invention has particularly well sliding properties, since a uniform lubricant film may form across the sliding surface. In contrast, in common sliding bearings the joint is often arranged so as to be offset with respect to the lubricant distribution groove as seen in the circumferential direction, which entails a worse lubricity of the bearing.

Moreover, it may be useful if a lubricating oil bore opens into the lubricant distribution groove. By means of the lubricating oil bore, the lubricant distribution groove may be supplied with lubricating oil.

Moreover, it may be provided that the sliding surface is formed on an outer jacket surface of the sliding bearing, wherein the lubricant distribution groove is formed by a notch in the form of a flattening. Such a sliding bearing may be easily produced and, moreover, has good sliding properties.

In addition to this, it may be provided that the joint comprises a clearance across the entire axial extension of the sliding bearing and an axial extension of the lubricant distribution groove merely extends across a partial section of the axial extension of the sliding bearing. By these measures, it may be achieved that the lubricant distribution groove is formed centrally with respect to the axial extension of the sliding bearing and thus the lubricating oil may be collected in the lubricant distribution groove. Particularly where a clearance in the region of the joint is required in the sliding bearing anyway, it is a surprising advantage regarding the sliding properties of the sliding bearing if the clearance coincides with the lubricant distribution groove.

A design, according to which it may be provided that the lubricant distribution groove has a maximum depth and the sliding layer has a layer thickness, wherein the maximum depth of the lubricant distribution groove is equally large or smaller than the layer thickness of the sliding layer, is also advantageous. By this measure, it may be achieved that the lubricant distribution groove may simultaneously serve as clearance for the joint of the support body.

According to an advancement, it is possible that the clearance has a maximum depth, wherein the maximum depth of the clearance is smaller than the maximum depth of the lubricant distribution groove. By this measure, it may be achieved that the lubricating oil collected in the lubricant distribution groove may leak axially via the clearance in amounts as low as possible.

According to the invention, a planetary gearbox for a wind turbine, having at least one sliding bearing, in particular a planetary gear radial sliding bearing, is provided. The sliding bearing is formed according to one of the preceding claims.

According to the invention, moreover, a method for producing the sliding bearing, in particular for a gearbox of a wind turbine, is provided. The sliding bearing comprises a support body and a sliding layer which is applied on the support body, and on which a sliding surface is formed, wherein a lubricant distribution groove extending in an axial direction is formed on the sliding surface. The method comprises the following method steps:

providing a support body strip having a first longitudinal end and a second longitudinal end;

rolling the support body strip to a bush, which forms the support body;

establishing a materially bonded connection of the first longitudinal end and the second longitudinal end of the support body strip at a joint;

inserting the lubricant distribution groove into the sliding layer, wherein the lubricant distribution groove is arranged at a location on the sliding bearing, at which the joint is formed.

The method according to the invention entails the surprising advantage that by the method steps according to the invention, a particularly advantageous sliding bearing may be produced.

Moreover, it may be provided that the sliding layer or parts thereof is/are applied to the still flat support body strip, in particular that the sliding layer is applied to the support body strip by roll cladding.

According to a particular design, it is possible that the lubricant distribution groove and/or the clearance of the joint is produced by mechanical processing, in particular by milling. Moreover, it may be provided that the axial extension of the lubricant distribution groove amounts to between 50% and 100%, in particular between 60% and 95%, preferably between 70% and 80% of the axial extension of the sliding bearing.

Moreover, it may be provided that the maximum depth of the clearance amounts to between 0.01 mm and 3 mm, in particular between 0.05 mm and 1 mm, preferably between 0.1 mm and 0.5 mm Moreover, it may be provided that the maximum depth of the lubricant distribution groove amounts to between 0.1 mm and 7 mm, in particular between 0.5 mm and 5 mm, preferably between 1 mm and 3 mm.

In the present document, lubricating oil is assumed to be the lubricant. However, it is a measure common to the person skilled in the art that another lubricant, for example grease, can also be transported in the present structure of the planetary gearbox and/or the sliding bearing and that the scope of protection is therefore not limited to the use of a particular lubricant.

For the purpose of better understanding of the invention, it will be elucidated in more detail by means of the figures below.

These show in a respectively very simplified schematic representation:

FIG. 1 a sectional view of an embodiment variant of the planetary gearbox;

FIG. 2 a perspective representation of a first exemplary embodiment of a sliding bearing in a first view;

FIG. 3 a perspective representation of a first exemplary embodiment of a sliding bearing in a second view;

FIG. 4 a sectional view according to section line IV-IV in FIG. 2;

FIG. 5 a schematic representation of the sequence of the individual production steps for producing the sliding bearing.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows an exemplary embodiment of a planetary gearbox 1 in a sectional view according to a cross section along a centerline 2 of the planetary gearbox 1. The view according to FIG. 1 is shown schematically and serves for general explanation of the structure of the planetary gearbox and for showing the components installed in a planetary gearbox.

As is known, wind turbines comprise a tower on the upper end of which a nacelle is arranged, in which the rotor with the rotor blades is mounted. This rotor is operatively connected to a generator, which is also located in the nacelle, via the planetary gearbox 1, wherein the low rotational frequency of the rotor is translated into a higher rotational frequency of the generator rotor via the planetary gearbox 1. Since such designs of wind turbines are part of the prior art, at this point, reference is made to the relevant literature in this regard.

The planetary gearbox 1 has a sun gear 3 connected in a motion-coupled manner to a shaft 4 leading to the generator rotor. The sun gear 3 is surrounded by multiple planetary gears 5, for example two, preferably three. Both the sun gear 3 and the planetary gears 5 have outer end toothings, which are engaged in a meshing arrangement, wherein these end toothings are schematically represented in FIG. 1.

The planetary gears 5 are each accommodated in a planetary carrier 7 by means of a planetary gear bolt 6. Moreover, it may be provided that the planetary gear bolt 6 is fixed and/or accommodated in a first planet carrier cheek 8 and a second planet carrier cheek 9 in a force-fitted or positively locked manner In particular, it may be provided that the planetary gear bolt 6 is secured against rotation via any not explicitly shown securing element. The two planet carrier cheeks 8, 9 are parts of the planetary carrier 7.

An internal gear 10 is arranged to surround the planetary gears 5, which internal gear has an internal toothing which is engaged in a meshing arrangement with the end toothing of the planetary gears 5. The internal gear 10 may be formed in a single-part or multi-part planetary gearbox housing 11, and/or coupled thereto.

Moreover, it may be provided that in the planetary gearbox housing 11 at least one planetary carrier radial sliding bearing 12 is arranged, which serves for bearing the planetary carrier 7 in the planetary gearbox housing 11.

In particular, it may be provided that in the first planet carrier cheek 8, an oil distribution channel section 13 is formed, by means of which the individual sliding surfaces 17 of the individual sliding bearings 12, 14, 21 may be supplied with lubricating oil.

Moreover, it may be provided that for bearing the planetary gears 5, at least one planetary gear radial sliding bearing 14 is provided on the planetary gear bolts 6 of each planetary gear 5.

According to a first embodiment variant, the planetary gear radial sliding bearing 14 is mounted on an inner jacket surface 15 on the planetary gear bolt 6. A sliding surface 17 is formed on an outer jacket surface 16 of the planetary gear radial sliding bearing 14. Moreover, it may be provided that in the planetary gear radial sliding bearing 14, a lubricating oil bore 18 is formed which is guided from the inner jacket surface 15 of the planetary gear radial sliding bearing 14 to the outer jacket surface 16 of the planetary gear radial sliding bearing 14.

Moreover, it may be provided that at least one lubricant distribution groove 19, which is fluidically coupled to the lubricating oil bore 18 in the planetary gear radial sliding bearing 14 is formed on the outer jacket surface 16 of the planetary gear radial sliding bearing 14. In particular, it may be provided that two lubricating oil bores 18 and two lubricant distribution grooves 19 are formed on the planetary gear radial sliding bearing 14 so as to diametrically oppose one another. A detailed exemplary embodiment of the planetary gear radial sliding bearing 14 will be described below in FIG. 2 in more detail.

As can also be seen from FIG. 1, it may be provided that oil distribution channel sections 20, which open into the lubricating oil bores 18 of the planetary gear radial sliding bearing 14, are formed in the planetary gear bolt 6.

As can further be seen from FIG. 1, it may be provided that a sun gear radial sliding bearing 21 is formed which serves for bearing the shaft 4 on which the sun gear 3 is mounted. In particular, it may be provided that the first sun gear radial sliding bearing 21 is arranged between a cavity of the first planet carrier cheek 8 and the shaft 4.

FIG. 2 shows a first exemplary embodiment of the sliding bearing 22 in a first perspective view of its front side.

FIG. 3 shows the first exemplary embodiment of the sliding bearing 22 in a second perspective view of its rear side.

Figure 2:
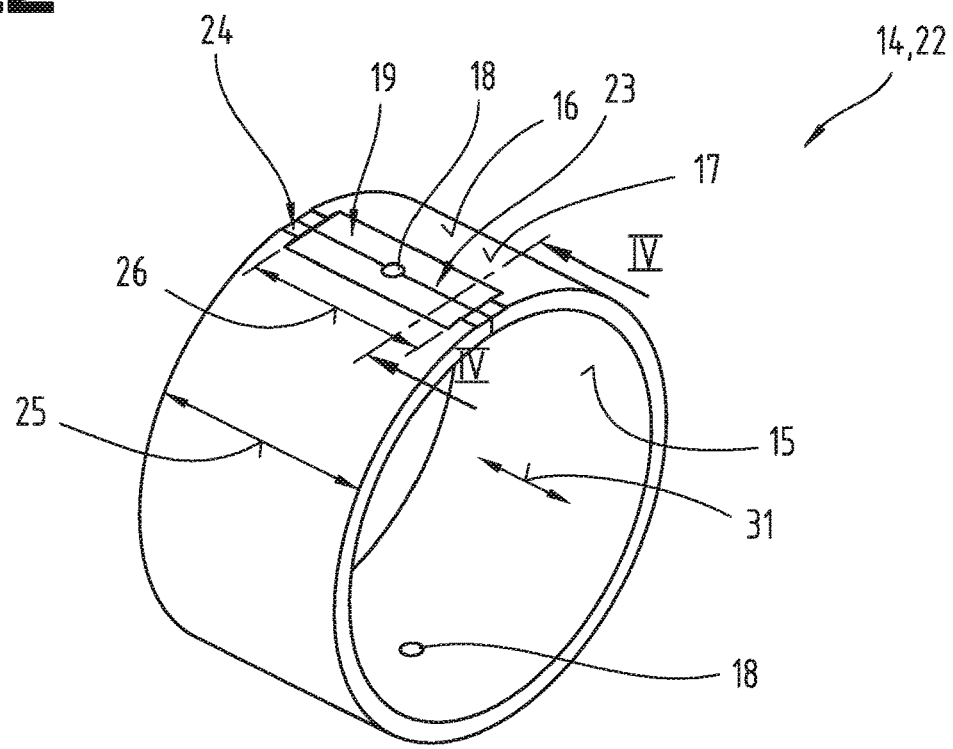
FIGS. 2 and 3 show a further and possibly independent embodiment of the sliding bearing 22, wherein again, equal reference numbers/component designations are used for equal parts as before in FIG. 1. In order to avoid unnecessary repetitions, it is pointed to/reference is made to the detailed description in FIG. 1 preceding it.

In a gearbox for wind turbines, in particular in the planetary gearbox 1, the planetary carrier radial sliding bearing 12 and/or the planetary gear radial sliding bearing 14 and/or the sun gear radial sliding bearing 21 may have the structure described in FIG. 2. Of course, other sliding bearings, which are not installed in a wind turbine, may also have the structure according to the invention. Thus, for the sake of simplicity, the entirety of sliding bearings having the structure according to the invention are generally referred to as sliding bearings 22 in the present document. The structure of the sliding bearing 22 described in FIG. 2 may be used particularly for the planetary gear radial sliding bearing 14. Thus, the planetary gear radial sliding bearing 14 is described in detail, while, however, reference is made to the fact that the structure according to the invention may analogously be designed for all sliding bearings 22, in particular sliding bearings 22 used in a gearbox for wind turbines.

Figure 3:
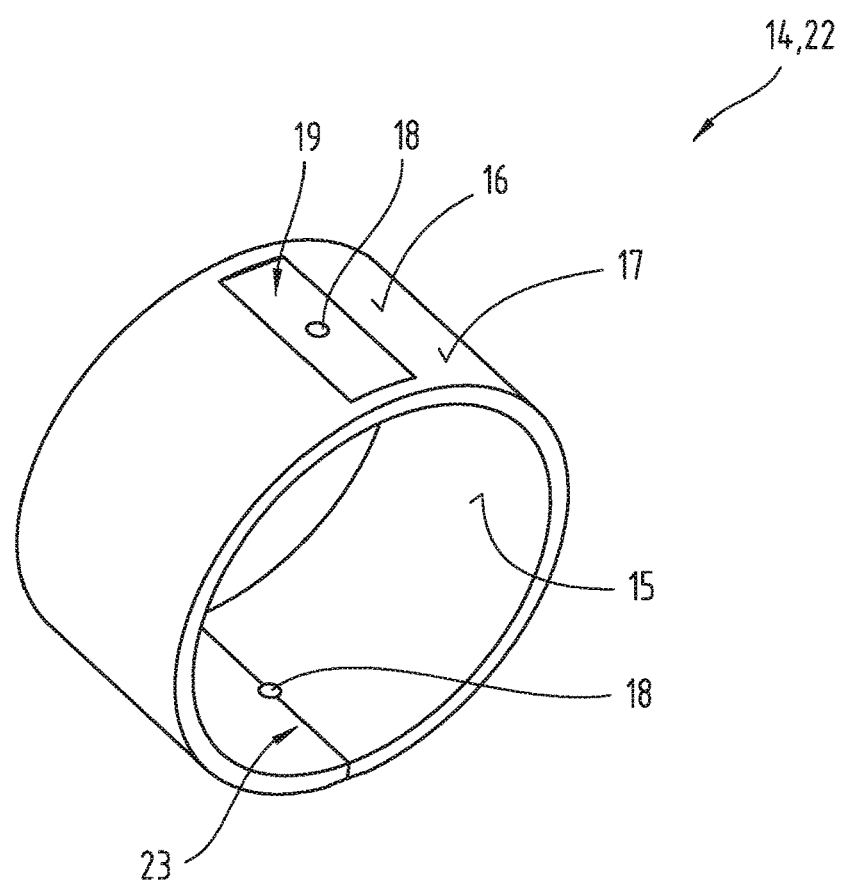

As can be seen in FIGS. 2 and 3, it may be provided that the sliding bearing 22 comprises two diametrically opposing lubricant distribution grooves 19 on its outer jacket surface 16. Of course, merely one lubricant distribution groove 19 or a larger number of lubricant distribution grooves 19 may be formed on the sliding bearing 22, which may be arranged across the circumference so as to be distributed uniformly or irregularly.

Moreover, it may be provided that the lubricating oil bores 18 each open into the lubricant distribution groove 19. The lubricating oil bores 18 serve for guiding lubricating oil from the inner jacket surface 15 of the sliding bearing 22 to the outer jacket surface 16 of the sliding bearing 22.

As can be seen particularly from FIG. 2, it may be provided that the sliding bearing 22 is formed as a rolled element, which is connected via a materially bonded connection at a joint 23 and thus forms a bush. The materially bonded connection of the joint 23 may for example be established by means of a welding process.

As a welding process, for example, laser welding may be used. In particular, it may be provided that in one method step, that side of the joint 23 is welded on which the support body 27 is formed. In this regard, the energy input by the laser beam may be selected such that merely the material of the support body 27, in particular steel, is melted, such that no melt mixture with the material of the bearing metal layer 28 occurs. In a further method step, that side of the joint 23 may be welded on which the bearing metal layer 28 is formed, so as to also melt this layer. In this regard, the energy input by the laser beam may be selected such that merely the material of the bearing metal layer 28 is melted, such that no melt mixture with the material of the support body 27 occurs. This results in a joint 23 with a surprisingly high solidity. The described approach may, of course, be applied in both, those sliding bearings 22 in which the support body 27 forms the innermost layer and those sliding bearings 22 in which the support body 27 forms the outermost layer.

In a further embodiment variant, it may also be provided that electron-beam welding is used as the welding method. Of course, the methodology described above may be used also in this welding method.

In the alternative to this, it is also conceivable that the materially bonded connection at the joint 23 is established by means of a soldering method.

As can further be seen from FIG. 2, it may be provided that in the region of the joint 23 a clearance 24 is formed, by means of which it may be achieved that possible protrusions of the weld seam produced by the joining process do not extend into an enveloping cylinder of the sliding surface 17 and thus the sliding properties of the sliding bearing 22 are not impaired.

As can be seen from FIG. 2, it is provided that the lubricant distribution groove 19 is formed in the region of the joint 23. Hence, it may be achieved that the required clearance 24 and the lubricant distribution groove 19 coincide a least in some sections. The production process of the sliding bearing 22 may thus be facilitated.

As can further be seen from FIG. 2, it may be provided that the clearance 24 extends across the entire axial extension 25 of the sliding bearing 22. An axial extension 26 of the lubricant distribution groove 19 may be smaller than the axial extension 25 of the sliding bearing 22. In particular, it may be provided that the lubricant distribution groove 19 is arranged on the sliding bearing 22 centrally with respect to the axial extension 25 thereof. Moreover, it may also be provided that the lubricating oil bore 18 is arranged on the sliding bearing 22 centrally with respect to the axial extension 25 thereof. As can be seen from the exemplary embodiment according to FIG. 2, it may be provided that the lubricating oil bore 18 is arranged centrally in the lubricant distribution groove 19 also as viewed in the circumferential direction. Moreover, it may be provided that the joint 23 is arranged centrally to the lubricant distribution groove 19 in the circumferential direction.

In a further exemplary embodiment, which is not shown, it may also be provided that the lubricating oil bore 18 and/or the joint 23 are arranged eccentrically to the lubricant distribution groove 19 as viewed in the circumferential direction. Thereby, it may for example be achieved that the lubricating oil bore 18 is not arranged in the region of the joint 23 but next to the joint 23.

As can further be seen from FIGS. 2 and 3, the lubricant distribution groove 19 extends in an axial direction 31. The joint 23 also extends in the axial direction 31.

Figure 1:
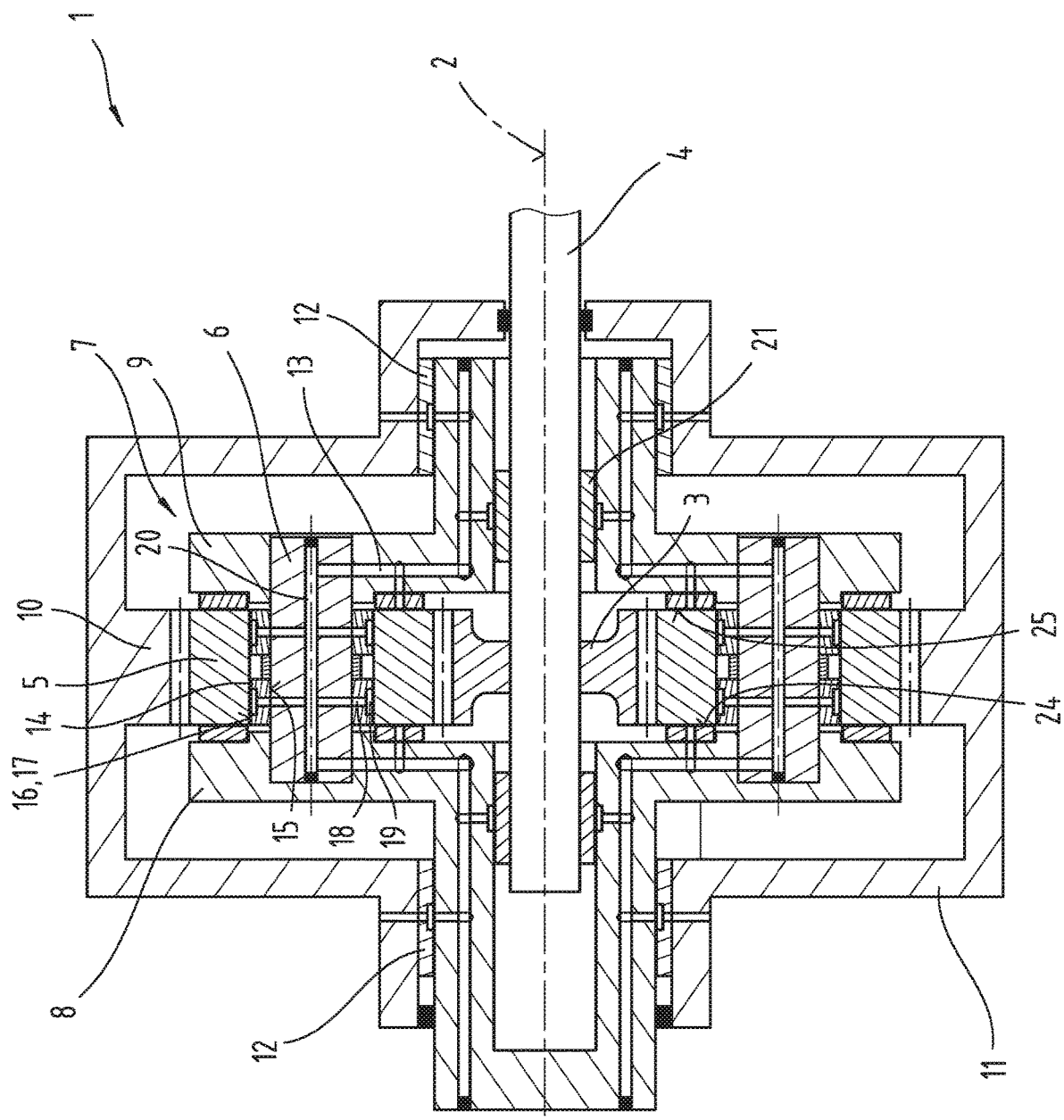

FIG. 4 shows a detail view of the sliding bearing 22 in a section IV-IV, wherein again, equal reference numbers and/or component designations are used for equal parts as in FIGS. 1 through 3 above. In order to avoid unnecessary repetitions, it is pointed to/reference is made to the detailed description in FIGS. 1 through 3 preceding it.

As can be seen from FIG. 4, it may be provided that the sliding bearing 22 comprises a support body 27, a bearing metal layer 28 as well as a polymer layer 29. The sliding surface 17 may be formed on the polymer layer 29.

The support body 27 preferably consists of a metallic material, commonly of steel, may, however, also consist of a material by means of which the same and/or a similar function, namely the provision of the mechanical strength of the sliding bearing 22 may be realized. For example, diverse copper alloys, such as brass, bronzes, may be used.

The bearing metal layer 28 is formed by a bearing metal alloy. Such bearing metal alloys are known from the prior art. For example, the bearing metal alloy can be formed by an alloy based on tin, bismuth, indium, lead or aluminum as well as alloys based on CuPb, possibly with a high lead content, or on AlSn or AlBi.

Although the sliding bearing 22 is shown as a three-layer bearing element in FIG. 1, the sliding bearing 22 may also have less or more than three layers. For example, the polymer layer 29 may be applied directly onto the support body 27. Likewise, common intermediate layers, such as at least one bonding layer or at least one diffusion barrier layer, may be arranged if required. The at least one bonding layer may for example be arranged between the support body 27 and the bearing metal layer 28 and/or between the bearing metal layer 28 and the polymer layer 29. The at least one diffusion barrier layer may for example be arranged between the support body 27 and the bearing metal layer 28 and/or between the bearing metal layer 28 and the polymer layer 29.

For the sake of simplicity, the layer structure applied at the support body 27, which may for example comprise the bearing metal layer 28 and the polymer layer 29, is referred to as sliding layer 30.

The polymer layer 29 may comprise solid lubricant particles and metal oxide particles and merely a polyimide polymer or a polyamide-imide polymer as its polymer and/or preferably consist of these components.

The polyimide polymer may for example be selected from a group comprising or consisting of polyimide (PI), polysuccinimide (PSI), polybismaleinimide (PBMI), polybenzimidazole (PBI), polyoxadiazobenzimidazole (PBO), and polyimide sulfone (PISO), and mixtures thereof.

Preferably, the polymer is a polyamideimide. The polyamideimide may comprise at least partially aromatic groups, preferably it is a fully aromatic polyamideimide.

FIG. 5 schematically shows the individual method steps for producing the sliding bearing 22. As can be seen in FIG. 5, it may be provided that a support body strip 32 is provided which comprises a first longitudinal end 33 and a second longitudinal end 34. In a first exemplary embodiment, the support body strip 32 may comprise the sliding layer 30 which has already been applied to the support body strip 32. In this regard, the sliding layer 30 may, for example, have been applied to the support body strip 32 by roll cladding.

In a further embodiment variant, it may also be provided that the sliding layer 30 is applied only to the finished rolled support body 27.

As can be seen from FIG. 5, it may be provided that the support body strip 32 is rolled to a bush 35 by means of a rolling process, wherein the first longitudinal end 33 and the second longitudinal end 34 of the support body strip 32 are approximated to one another. In the finished rolled bush 35, the first longitudinal end 33 and the second longitudinal end 34 may be adjacent to each other and/or spaced a small distance apart such that the two longitudinal ends 33, 34 can be connected in a materially bonded manner at the joint 23.

In an embodiment variant in which the sliding layer 30 has already been applied to the support body strip 32, it may be provided that either already in the flat support body strip 32 or only in a rolled bush 35, the sliding layer 30 is removed in the region of the longitudinal ends 33, 34, such that the longitudinal ends 33, 34 of the support body strip 32 are freely accessible for the materially bonded connection. This method step may optionally also be left out.

In a further method step, subsequently, the first longitudinal end and the second longitudinal end 33, 34 of the support body strip 32 may be welded together at the joint 23. In a subsequent method step, the clearance 24 may be generated by mechanical removal, in particular by milling. In particular, the protruding material of the weld seam is removed in the clearance 24.

If, as described above, the sliding layer 30 has already been sufficiently removed before welding the two longitudinal ends 33, 34 of the support body strip 32, this can optionally act as the clearance 24 subsequently, which means that no further processing step is required after the welding process.

In a further processing step, the lubricant distribution groove 19 may be generated by mechanical removal, in particular by milling.

As can be seen from FIG. 4, it may be provided that the lubricant distribution groove 19 comprises a groove base 36 which tapers off into the outer jacket surface 16 of the sliding bearing 22. In such a design, a wedge gap 37 forms at the edge of the lubricant distribution groove 19 as seen in the circumferential direction.

In an alternative embodiment variant, it may of course also be provided that the groove base 36 of the lubricant distribution groove 19 does not taper off into the outer jacket surface 16 but that the lubricant distribution groove 19 is provided in the form of a recess and the groove base 36 is thus bounded by side walls as seen in the circumferential direction. The lubricant distribution groove 19 has a maximum depth 38 which is measured starting out from an enveloping cylinder of the outer jacket surface 16. The maximum depth 38 of the lubricant distribution groove 19 may extend across a layer thickness 39 of the sliding layer 30. The width 40 of the lubricant distribution groove 19 results from the diameter of the outer jacket surface 16 and the maximum depth 38 of the lubricant distribution groove 19.

The clearance 24 has a maximum depth 41, which is also measured from an enveloping cylinder of the outer jacket surface 16 to a groove base 42 of the clearance 24. As can be seen from FIG. 4, it may be provided that, as viewed in the circumferential direction, a first clearance groove wall 44 and/or a second clearance groove wall 45 are formed, which form a transition between the groove base 42 of the clearance 24 and the outer jacket surface 16 of the sliding bearing 22. This is the case where the maximum depth 41 of the clearance 24 is selected to be so large in relation to the width 43 of the clearance 24 that the groove base 42 of the clearance 24 cannot taper off into the outer jacket surface 16 of the sliding bearing 22.

As can be seen from FIG. 4, it may be provided that the maximum depth 38 of the lubricant distribution groove 19 is larger than the maximum depth 41 of the clearance 24. The maximum depth 41 of the clearance 24 is selected to be as small as possible such that during the use of the sliding bearing 22 as little as possible of the lubricant guided into the lubricant distribution groove 19 can leak axially via the clearances 24.

As can be seen from FIG. 4, it may be provided that the width 40 of the lubricant distribution groove 19 is larger than the width 43 of the clearance 24.

In a further exemplary embodiment, which is not shown, it may of course also be provided that the sliding surface 17 and thus also the lubricant distribution grooves 19 are arranged on the inner jacket surface 15 of the sliding bearing 22. It is within the capabilities of the person skilled in the art to redesign the structure of the sliding bearing accordingly on the basis of the exemplary embodiment described.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| | |
|---|---|
| 1 | planetary gearbox |
| 2 | centerline of planetary gearbox |
| 3 | sun gear |
| 4 | shaft |
| 5 | planetary gear |
| 6 | planetary gear bolt |
| 7 | planetary carrier |
| 8 | first planet carrier cheek |
| 9 | second planet carrier cheek |
| 10 | internal gear |
| 11 | planetary gearbox housing |
| 12 | planetary carrier radial sliding bearing |
| 13 | oil distribution channel section of the first planet carrier cheek |
| 14 | planetary gear radial sliding bearing |
| 15 | inner jacket surface of the planetary gear radial sliding bearing |
| 16 | outer jacket surface of the planetary gear radial sliding bearing |
| 17 | sliding surface of the planetary gear radial sliding bearing |
| 18 | lubricating oil bore of the planetary gear radial sliding bearing |
| 19 | lubricant distribution groove |
| 20 | oil distribution channel section of the planetary gear bolt |
| 21 | sun gear radial sliding bearing |
| 22 | sliding bearing |
| 23 | joint |
| 24 | clearance |
| 25 | axial extension of the sliding bearing |
| 26 | axial extension of the lubricant distribution groove |
| 27 | support body |
| 28 | bearing metal layer |
| 29 | polymer layer |
| 30 | sliding layer |
| 31 | axial direction |
| 32 | support body strip |
| 33 | first longitudinal end |
| 34 | second longitudinal end |
| 35 | bush |
| 36 | groove base of the lubricant distribution groove |
| 37 | wedge gap |
| 38 | maximum depth of the lubricant distribution groove |
| 39 | layer thickness of the sliding layer |
| 40 | width of the lubricant distribution groove |
| 41 | maximum depth of the clearance |
| 42 | groove base of the clearance |
| 43 | width of the clearance |
| 44 | first clearance groove wall |
| 45 | second clearance groove wall |

The invention claimed is:

1. A sliding bearing (22), in particular for a gearbox of a wind turbine, having a support body (27) and a sliding layer (30) which is applied on the support body (27), and on which a sliding surface (17) is formed, wherein a lubricant distribution groove (19) extending in an axial direction (31) of the sliding surface (17) is formed on the sliding surface (17), wherein the support body (27) is formed as a bush (35) rolled from a support body strip (32), wherein a first longitudinal end (33) and a second longitudinal end (34) of the support body strip (32) are connected to one another in a materially bonded manner, in particular by a welding connection, at a joint (23), wherein the joint (23) is formed in the region of the lubricant distribution groove (19).

2. The sliding bearing (22) according to claim 1, wherein a lubricating oil bore (18) opens into the lubricant distribution groove (19).

3. The sliding bearing (22) according to claim 1, wherein the sliding surface (17) is formed on an outer jacket surface (16) of the sliding bearing (22), wherein the lubricant distribution groove (19) is formed by a notch in the form of a flattening.

4. The sliding bearing (22) according to claim 1, wherein the joint (23) comprises a clearance (24) across the entire axial extension (25) of the sliding bearing (22) and an axial extension (26) of the lubricant distribution groove (19) merely extends across a partial section of the axial extension (25) of the sliding bearing (22).

5. The sliding bearing (22) according to claim 1, wherein the lubricant distribution groove (19) has a maximum depth (38) and the sliding layer (30) has a layer thickness (39), wherein the maximum depth (38) of the lubricant distribution groove (19) is equally large or smaller than the layer thickness (39) of the sliding layer (30).

6. The sliding bearing (22) according to claim 1, wherein the clearance (24) has a maximum depth (41), wherein the maximum depth (41) of the clearance (24) is smaller than the maximum depth (38) of the lubricant distribution groove (19).

7. A planetary gearbox (1) for a wind turbine, having at least one sliding bearing (22), in particular a planetary gear radial sliding bearing (14), wherein the sliding bearing (22) is designed according to claim 1.

8. A method for producing a sliding bearing (22), in particular for a gearbox of a wind turbine, wherein the sliding bearing (22) comprises a support body (27) and a sliding layer (30) which is applied on the support body (27), and on which a sliding surface (17) is formed, wherein a lubricant distribution groove (19) extending in an axial direction (31) is formed on the sliding surface (17), comprising the method steps:
  providing a support body strip (32) having a first longitudinal end (33) and a second longitudinal end (34);
  rolling the support body strip (32) to a bush (35), which forms the support body (27);
  establishing a materially bonded connection of the first longitudinal end (33) and the second longitudinal end (34) of the support body strip (32) at a joint (23);
  inserting the lubricant distribution groove (19) into the sliding layer (30), wherein the lubricant distribution groove (19) is arranged at a location on the sliding bearing (22), at which the joint (23) is formed.

9. The method for producing a sliding bearing (22) according to claim 8, wherein the sliding layer (30) or parts thereof is/are applied to the still flat support body strip (32), in particular that the sliding layer (30) is applied to the support body strip (32) by roll cladding.

10. The method for producing a sliding bearing (22) according to claim 8, wherein the lubricant distribution groove (19) and/or the clearance (24) of the joint (23) is produced by mechanical processing, in particular by milling.

* * * * *